United States Patent [19]

Miller et al.

[11] Patent Number: 5,212,746

[45] Date of Patent: May 18, 1993

[54] SINGLE WAFERED FERRULE FIBER FABRY-PEROT FILTERS

[75] Inventors: Calvin M. Miller, Atlanta; Jeffrey W. Miller, Symrna, both of Ga.

[73] Assignee: Micron Optics, Inc., Atlanta, Ga.

[21] Appl. No.: 821,484

[22] Filed: Jan. 15, 1992

Related U.S. Application Data

[63] Continuation-in-part of Ser. No. 801,450, Dec. 2, 1991.

[51] Int. Cl.⁵ ............................................. G02B 6/26
[52] U.S. Cl. ...................................... 385/25; 385/49; 385/52; 385/64; 385/73; 385/75
[58] Field of Search ...................... 385/25, 27, 31, 49, 385/52, 73, 75, 97, 98, 99

[56] References Cited

U.S. PATENT DOCUMENTS

| | | | |
|---|---|---|---|
| 4,545,644 | 10/1985 | DeVeau et al. | 385/27 |
| 4,813,756 | 3/1989 | Frenkel et al. | 385/73 |
| 4,830,451 | 5/1989 | Stone | 385/50 |
| 4,861,136 | 8/1989 | Stone et al. | 385/64 |
| 4,923,273 | 5/1990 | Taylor | 385/48 |
| 5,062,684 | 11/1991 | Clayton et al. | 385/27 |
| 5,073,004 | 12/1991 | Clayton et al. | 385/27 |

FOREIGN PATENT DOCUMENTS

0457484 11/1991 European Pat. Off. .

OTHER PUBLICATIONS

Stone et al., *Elect. Lett.*, 23(15), Jul. 16, 1987, "Pigtailed high-finesse tunable fibre Fabry-Perot Interferometers with Large, Medium and Small Free Spectral Ranges", pp. 781-783.

*Primary Examiner*—Frank Gonzalez
*Attorney, Agent, or Firm*—Greenlee & Winner

[57] ABSTRACT

A single wafered optical fiber ferrule assembly useful in fixed and tunable fiber Fabry-Perot (FFP) filters is described. The ferrule assembly contains a wafered ferrule with embedded mirror and a mirrored-end ferrule which are aligned with respect to each other along a longitudinal axis in an alignment fixture. The ferrules are aligned and spaced with respect to each other to maximize transmission of light of a selected wavelength through the filter. The wafered ferrule is composed of a fiber ferrule and a wafer greater than or equal to about 5 μm in thickness which are bonded together with a mirror embedded between the wafer and the ferrule. The ferrule assembly forms a FP optical resonance cavity between the two mirrors. The single wafered ferrule design produces more easily manufactured and more stable FFP than prior art designs.

40 Claims, 9 Drawing Sheets

SINGLE WAFERED FERRULE FIBER FABRY-PEROT FILTERS

This application is a continuation-in-part of U.S. Ser. No. 07/801,450 (now allowed), filed Dec. 2, 1991, which is incorporated in its entirety by reference herein.

Technical Field

This invention relates generally to Fabry-Perot optical fiber filters. In particular, the invention relates to optical fiber ferrule assemblies which are useful in the construction of low-loss, high finesse (F) optical filters with accurately controllable and manufacturable Free Spectral Range (FSR) and Band Width (BW).

BACKGROUND OF THE INVENTION

Transmission of information by the use of light over optical fibers is widely used in long-haul telecommunication systems. Optical signals are generated, transported along optical fibers and detected to regenerate the original electronic signal with as little change as possible. Fibers are substituted for other transmission media and all signal processing is done electronically, resulting in lowered cost and high quality digital transmission.

As fiber optic applications technology develops direct optical processing of signals without conversion to electronic signals will be required. Optical fiber systems will be applied in computer networks, for example, in multiple access computer networks. Such applications will require optical fiber devices such as amplifiers, multiplex/demultiplexers, splitters, couplers, filters, equalizers, switches and other optical signal processors. An economical low-loss, easily and reproducibly manufactured single-mode optical fiber filter, the design of which can be adapted to a desired bandwidth, FSR and finesse is an important component for such fiber optic systems. A fiber Fabry-Perot (FFP) interferometric filter is such a component.

The Fabry-Perot (FP) Interferometer was first described by C. Fabry and A. Perot in 1897 (Ann. Chem. Phys., 12:459–501) and has since found wide use in a variety of applications of optical filters. The basic structure and operation of the FP interferometer is well-known in the art and is described in many physics and optics texts (see, for example, E. Hecht "Optics" 2nd. Edition (1987) Addison-Wesley, Reading Mass., p. 369). This interferometer consists of an optical cavity formed between two typically highly reflecting, low-loss, partially transmitting mirrors. Lenses are typically used to collimate divergent optical beams for processing through the FP interferometer.

While single-mode optical fibers can be used with lensed conventional FP interferometers, lenses with large beam expansion ratios are required and result in reduced stability and poor optical performance. The adaptation of FP cavities for optical fiber filters has been hindered by the lack of practical designs for FFPs with appropriate optical properties. Recently, FFPs which possess optical properties suitable for telecommunication applications have been described. These FFPs consist of two highly reflective, preferably plane-parallel mirrors, forming the optical cavity through which, in most cases, a length of single-mode optical fiber extends. This basic design eliminates the need for collimating and focusing lenses, improves stability and optical performance and makes the FFPs compatible with single-mode optical fibers and other fiber devices.

In 1987, J. Stone and L. W. Stulz described three configurations of FFP interferometric filters (Elect. Lett., 23(15):781–783, 1987) that span a wide spectrum of bandwidths and tuning ranges. The Type I FFP is a long cavity FFP in which mirrors are deposited at the ends of a continuous fiber. The minimal cavity length is about 1 cm (FSR of about 10 GHz), so that this long cavity device is not necessarily important for telecommunication applications. In the Type I FFP, the fiber can be stretched by piezoelectric transducers (PZTs) to produce tuning of the bandwidth (BW) over the free spectral range (FSR).

The Type II FFP of Stone and Stulz is a gap resonator which has no fiber inside the optical cavity and so can exhibit significant losses. Due to such losses, the useful cavity length of this type of FFP is less than about 5 μm. The Type II FFP is also not well-suited for telecommunication applications.

The Type III FFP is better suited to telecommunication applications than the Type I and II FFPs. This type of FFP has an internal waveguide interposed between external fiber ends. Mirrors are positioned at an external fiber end and at one end of the waveguide. The waveguide is comprised within the optical cavity. The optical cavity also contains a gap, the width of which is fixed or can be changed to tune the filter.

The ferrule components and waveguide of Type II and III FFPs must be axially aligned to high precision in order to minimize transmission loss. Type II and III FFPs are the subject of U.S. Pat. No. 4,861,136. This patent relates to FFPs which are tuned by use of PZTs to change the cavity length. In order to use PZTs to change cavity length without detriment to alignment elaborate alignment brackets and fixtures were necessary.

Clayton and Miller, U.S. Pat. No. 5,062,684, describe fiber ferrule assemblies which are useful in the construction of FFPs. The ferrule assemblies described are composed of two wafered ferrules, each of which contains an embedded mirror. Each wafered ferrule contains an axial passageway, along its longitudinal axis, in which an optic fiber is positioned. A mirror is deposited at the ferrule end face to which the wafer is bonded. The wafered ferrules are aligned in an alignment fixture to maximize transmission through the fibers and such that an optical cavity is formed between the two mirrors. The dual wafer ferrule assembly is said to protect mirrors from inadvertent damage. Fixed and cavity length tunable FFP having a dual wafered ferrule assembly are described.

While dual-wafered ferrule assemblies meet certain of the requirements for practical FFP designs with useful optical properties, the dual-wafered ferrule FFP is limited to a maximum FSR of about 8,000 to 10,000 GHz. Further, the optical cavity of a dual-wafered ferrule FFP contains two glass/air interfaces at the wafer end faces which can have a significant effect on the variation of FSR with wavelength. This can also lead to significant variations in finesse and BW among ferrule assemblies in which the reflectivities of the mirrors are the same. The ability to efficiently reproduce desired optical properties in the manufacture of FFPs can be significantly impaired by this variability. The difficulty in controlling the finesse of a dual-wafered ferrule FFP increases markedly in high finesse filters, i.e., in filters designed to have a finesse of 100 or more. Sensitivity to alignment offset is perhaps the most important optical property of an FFP filter. Since alignment error is always present, and the level of sensitivity to this error determines the corresponding insertion loss, ruggedness and long-term stability of the device. Increasing the uniformity of manufacture of FFP ferrule elements and increasing the ability to control the optical properties of these elements results in significantly increased production yield of FFPs having desired specifications and, thus, leads to significantly decreased manufacturing costs.

SUMMARY OF THE INVENTION

The problems of prior art ferrule assemblies for FFPs have been overcome in the single wafered ferrule assemblies and FFP filters of the present invention. With the single wafered ferrule assembly of the present invention, FFPs having FSR of up to about 16,000 to 20,000 GHz can be readily manufactured at reasonable cost. More importantly, the optical properties of single wafered ferrule FFPs are more easily controlled and reproduced than was possible for prior art FFPs. In addition, it has been found that single wafered ferrule FFPs are significantly less sensitive to alignment offset so that they are much easier to align, have lower insertional loss and have substantially improved alignment stability than prior art FFPs. The benefits of the single wafered ferrule assemblies for minimization of variations in finesse and FSR are particularly important for improving the reproducibility of manufacture and increasing the production yield of high finesse FFPs.

It is an object of this invention to provide easily manufactured, low-loss, fixed and tunable FFP filters. It is a further object of this invention to provide an FFP design that can be easily adapted to a wide range of FSR, finesse and bandwidth requirements. It is another object of this invention to provide readily and reproducibly manufactured FFPs having FSR less than about 20,000 GHZ. It is yet another object of this invention to provide readily and reproducibly manufactured FFPs having finesse of 50 or more.

To achieve these objects, the present invention provides FFP filters which comprise a ferrule assembly having an optical cavity along a length of optical fiber axially disposed there through. The ferrule assembly is an axial assembly of cylindrical fiber ferrule elements which includes one wafered ferrule with embedded mirror and one mirrored-end ferrule. Both ferrule elements have a substantially axial bore along their longitudinal axis for receiving an optical fiber. The wafered ferrule has a wafer portion and a ferrule portion, both of which have a substantially axial bore with an optical fiber disposed therein. In both the ferrule and the ferrule portion of the wafered ferrule, an optical fiber end (or terminus) is flush with one end face of the ferrule. In the wafer, an optical fiber end is flush with both end faces of the wafer. A first end of the wafer is aligned with and rigidly bonded to an end face of the ferrule such that one of the fiber ends of the wafer and that of the ferrule are aligned to maximize optical transmission through the fiber. A mirror is deposited on the end face of the second ferrule to form a mirrored ferrule and another mirror is deposited on the ferrule portion of the wafered ferrule covering the optical fiber end. The mirror deposited on the ferrule of the wafered ferrule covers only a portion of the end face in order that the wafer can be bonded to the end face to produce the wafered ferrule with embedded mirror.

The mirrored-end ferrule and the wafered ferrule with embedded mirror are axially aligned and spaced apart in an alignment fixture to maximize transmission of an optical signal of a selected wavelength or frequency through the optical fiber of the ferrule assembly to form an FFP. The optical fiber of the ferrule assembly is discontinuous and contains a gap between the mirrored end face of the second ferrule and the exposed wafer end of the wafered ferrule. An optical cavity is formed within the ferrule assembly, between the opposed mirror of the ferrule end face and the embedded mirror of the wafered ferrule. The optic fiber gap is within the optical cavity (also called the resonance cavity) of the FFP. The optical cavity length of a fixed FFP of this invention can be selected or set to obtain a desired transmission wavelength or frequency by choice of the length of the wafer and adjustment of the length of the gap within the optical cavity. A tunable FFP of this invention is achieved by providing a means for changing the optical path length of the FFP by changing the index of refraction of the cavity or the length of the cavity.

Ferrule elements of the FFPs of this invention, including ferrules and wafers, are preferably constructed from glass, i.e., Pyrex ®, or quartz. The wafer is preferably bonded to its ferrule with an adhesive that is transparent to light of wavelengths of the intended application of the FFP. For example, a UV-curable epoxy can be employed.

The outside diameter of the wafer end of the wafered ferrule can be reduced relative to the outside diameter of the ferrule portion of the wafered ferrule to facilitate entrance of the wafered ferrule into alignment fixtures. For example, the wafer end of the wafered ferrule can be bevelled. Changing the outside diameter of portions of the ferrule or wafered ferrule can be employed to change the tuning range of a tunable FFP.

Any suitable alignment fixture or supporting member which holds the elements of the ferrule assembly in rigid axial alignment to form an optical cavity can be employed in the FFPs of the present invention.

FFPs of the present invention can be tuned by changing the length of the optical cavity. Tunable FFPs of the present invention include those in which the ferrule assembly is mounted within an alignment fixture provided with a transducer system which functions to change the length of the optical cavity of the ferrule assembly. For example, piezoelectric transducers (PZTs) can be employed to change the cavity length.

The fixed cavity length FFP configurations of this invention can be rendered wavelength or frequency tunable by varying the optical path length of the cavity by changing the index of refraction of the optical cavity while maintaining the cavity length fixed. This can be accomplished by introducing into the gap within the cavity a material the index of refraction of which can be selectively changed or controlled. Such materials include electro-optic, magneto-optic and thermo-optic materials whose indices of refraction can be controlled, respectively, by a varying electric or magnetic field or by changing the temperature of the material. The magnitude of the effect and response speed of known electro-optic and magneto-optic materials make such materials well-suited for the production of optical modulators. The single wafered ferrule assemblies of this invention can be used in combination with such materials to produce FFP optical modulators.

In a preferred, fixed FFP of the present invention, the single wafered ferrule assembly is aligned with a rotary mechanical splice alignment fixture. This alignment fixture provides high precision alignment of the fiber of the ferrule assembly required to achieve low-loss operation of the FFP filter. In a more preferred, fixed FFP having a rotary mechanical splice alignment fixture, which is less sensitive to changes in temperature, the alignment rods of the rotary mechanical splice fixture are fabricated of a material having substantially the same thermal expansion coefficient as the material used to fabricate the fiber ferrule and wafered ferrule. In preferred embodiments, the alignment rods of a rotary mechanical splice alignment fixture of a fixed FFP are glass, i.e., Pyrex ®, or quartz.

The present invention also includes temperature tunable FFPs in which the ferrule assembly of an FFP is aligned within an alignment fixture which provides a means for changing the temperature of the FFP and thereby changing the length of the optical resonance cavity. The alignment fixture must provide temperature adjustable cavity length, while maintaining rigid axial alignment of the ferrule assembly elements to ensure low-loss of desired transmissions through the FIP. The alignment fixture must provide for elongation or contraction of the optical cavity along the optical fiber axis as a function of temperature without substantial change to the optical fiber alignment in the ferrule assembly, i.e., the alignment fixture should preferably expand and contract symmetrically along all of its dimensions. A means for changing the temperature of the FFP filter is placed in thermal contact with the FFP alignment fixture. Suitable means for temperature turing of the FFPs of the present invention include among others thermoelectric heater/coolers which function as heat pumps and resistive heaters.

The temperature tunable FFPs of the present invention can be narrowly or more broadly tunable. Broad tuning relates to those FFPs that are tunable over substantially a FSR (free spectral range), i.e., greater that about 85% of an FSR of the FFP with a relatively small temperature change, of less than about 20° to 30° C. Broadly tunable FFPs are particularly useful in applications requiring frequency or wavelength tuning. FFPs that are more narrowly tunable, e.g., over less than about 30% of an FSR with a larger temperature change of greater than about 20°-30° C. are of particular use in essentially fixed wavelength applications which require that the filter be adaptable to small wavelength of frequency fluctuations.

One exemplary narrowly tunable or trimmable FFP filter comprises a ferrule assembly aligned with a rotary mechanical splice alignment fixture having a means for changing the temperature of the FFP in thermal contact with the alignment fixture. The materials used in the preparation of ferrule assembly elements and alignment rods of the rotary mechanical splice can be adjusted to increase or decrease the temperature tuning range of an FFP. The tuning range of an FFP aligned with a rotary mechanical splice will generally increase if the alignment rods of the splice and the ferrule assembly elements are fabricated from materials which have different thermal expansion coefficients. The tuning range of such an FFP can also be changed by varying the length over which the ferrule assembly elements are in rigid contact wish the body of the alignment fixture. This can be accomplished by changing the outside diameter over portions of the ferrule assembly. FFP ferrules and wafered ferrules can be structurally adapted to change the length of rigid contact that they make with the alignment fixture and to thereby change the tuning range of an FFP.

An exemplary broadly tunable FFP of this invention comprises a ferrule assembly with fiber etalon cavity which is aligned employing a fixture having a one-piece body which expands or contracts symmetrically along all of its dimensions as a function of temperature. The fixture body is fabricated from materials having the same thermal expansion coefficient and has a cylindrical alignment passage for receiving and aligning ferrule assembly elements and rigidly holding those elements in relative axial alignment. The fixture is preferably fabricated from a material having a large positive thermal expansion coefficient, such as a metal, for example, stainless steel or brass. The fixture must be substantially non-deformable on applications of operational temperatures, i.e., temperatures used in tuning the filter. The alignment fixture comprises adjustable means for holding the ferrule assembly elements within the alignment passage in rigid contact with the body of the alignment fixture. For example, a plurality of screws which traverse the body of the alignment fixture to contact a ferrule within the alignment passage can be employed to rigidly hold that ferrule in contact with the body of the fixture. The alignment fixture can optionally have a means for adjusting alignment of the ferrule assembly. For example, an alignment adjustment screw can be provided which will contact a ferrule or waveguide of the ferrule assembly within the passage to change the relative axial position of that element with respect to the other ferrule assembly elements. Once positioned in the alignment passageway and held in fixed position, the fixed elements of the ferrule assembly will move in a direction along the axis of the optical fiber relative to each other as the alignment fixture symmetrically expands and contracts with temperature, so that the length of the resonance cavity of the FFP is thereby changed without substantial change to alignment of the ferrule assembly.

DETAILED DESCRIPTION OF THE INVENTION

Figure 1:
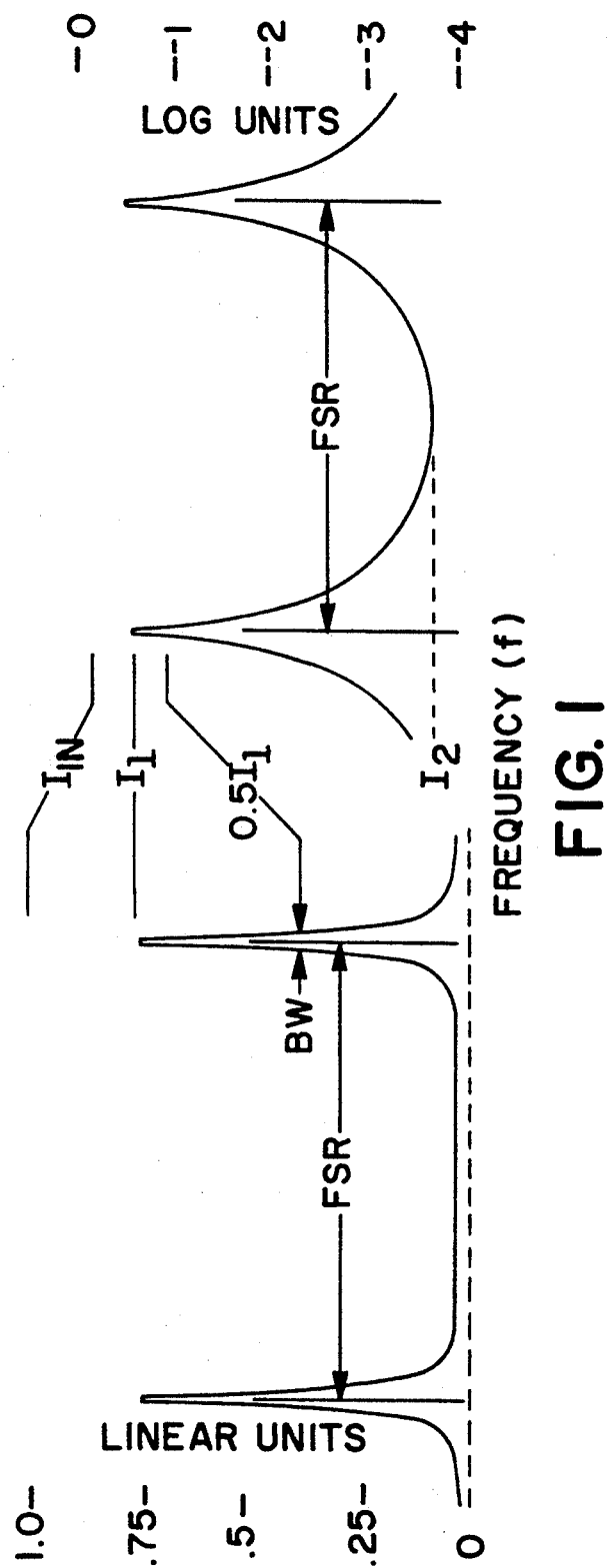
FIG. 1 is example transmission of an FFP of the present invention at fixed cavity length $l_c$.

FIG. 1 schematically shows the characteristics of transmission (frequency) of a typical FFP of length, $l_c$. The fractional transmitted power, $I_t/I_{in}$, through the optical cavity is $$I(f) = \frac{k}{1 + \left(\frac{2F}{\pi} \sin[2\pi n l_c/\lambda]\right)^2} \quad (1)$$

where $l_c$ is the cavity length which is the length of single-mode optical fiber and any fiber gaps or spacing between the mirrors which form the cavity, n is the index of refraction of the cavity material, F is the finesse of the cavity and k is the insertional loss. For the lossless case, k is 1 and the ideal F is dependent only on the reflectivities of the mirrors (R, where the reflectivities of the mirrors are assumed to be equal) and $$F = \frac{\pi \sqrt{R}}{(1 - R)} \quad (2)$$

For a fixed value of n, when $nl_c = m\lambda/2$, where m is an integer, equation 1 has maxima corresponding to a resonance condition within the cavity. Incident light with a wavelength ($\lambda$) that is an integer multiple of the cavity optical path length ($nl_c$) is transmitted with little attenuation. Incident light of other wavelengths is highly attenuated. For a given m, changing $l_c$ or $\lambda$ results in a shift in transmission maximum as shown in FIG. 1. Insertion loss is the minimum loss through the FFP and is equal to $-10 \log k$ or $-10 \log (I_1/I_{in})$ referring to FIG. 1. The difference between the frequencies of the resonance peaks, for constant $l_c$ and $\lambda$, is the free spectral range $(FSR) = c/2nl_c$, where $c = 3 \times 10^8 m/s$. Frequency (f) is equal to $c/\lambda$ and $\Delta f$ is equal to $-(c/\lambda^2)\Delta[$. An FFP is tuned between successive resonance maxima by, for example, changing $l_c$. (Alternatively, tuning of the FFP can be accomplished by changing n.) The bandwidth (BW) is the full width at half maximum as indicated in FIG. 1. The finesse of the filter, $F = FSR/BW$, can be measured experimentally by measuring the ratio of FSR to BW from the transmission curves generated by varying $l_c$ with constant $\lambda$. Measuring F in this manner accounts for all non-dispersive losses including mirror absorption, diffraction and alignment losses. If $\lambda$ is varied to generate transmission curves, dispersive properties of the mirrors, fibers, and cavity modes are also included in the measured FSR. The contrast factor (C) is equal to $-10 \log (I_2/I_1) = 10 \log [1 + (2F/\pi)^2]$.

Figure 2:
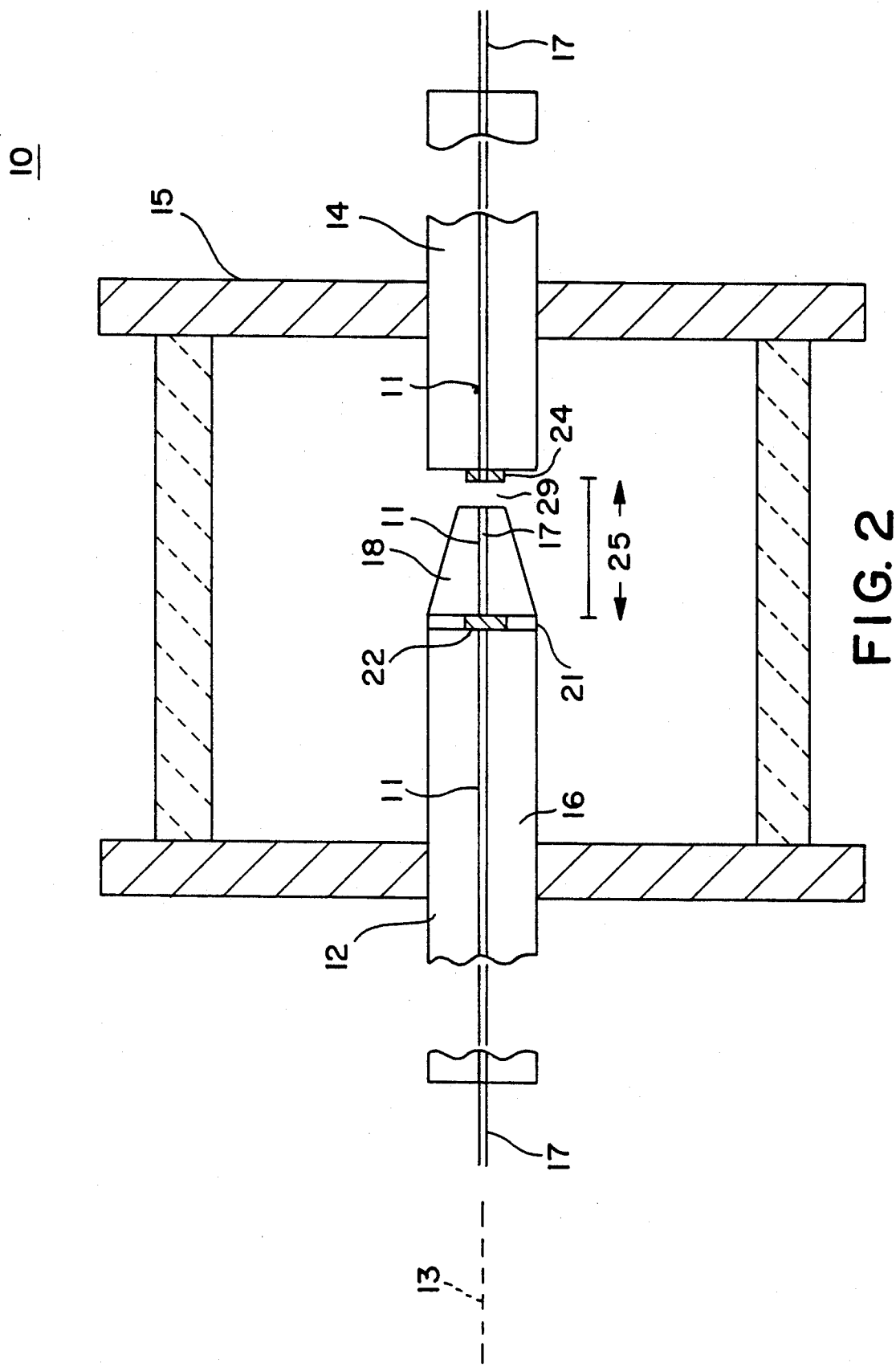
FIG. 2 is a schematic, cross-sectional view of an exemplary FFP ferrule assembly containing a single wafered ferrule of the present invention.

FIG. 2 shows an exemplary FFP filter (10) of this invention. The filter comprises a wafered ferrule (12) with ferrule (16) and wafer (18) and a mirrored-end ferrule (14). The ferrule (16) is bonded to a wafer (18) to form the wafered ferrule (12). The ferrules (16) and (14) are composed of capillary cylinders having an essentially axial bore (11) throughout their longitudinal capillary length through which a stripped optical fiber (17) is threaded. The wafer also has a substantially axial bore (11) with an optical fiber there through (17). The fiber is typically fixed within the axial bore with an appropriate adhesive, e.g., an epoxy adhesive. The ferrules serve as fiber terminus pieces with fibers extending from the ferrule assembly. At one end of each ferrule, the stripped fiber is cut flush with the ferrule end face and the end face is polished. The capillary cylinders are typically drawn glass, for example quartz or Pyrex ®. The optical fiber of the wafer is aligned with that of the ferrule to which it is bonded. A first mirror (22) is deposited at the first end face of the wafer (18) covering the optical fiber terminus at that end face. The mirror (22) is preferably not deposited over the entire face of the wafer to facilitate bonding of the wafer to the ferrule. A layer of adhesive (21) is positioned between the ferrule (16) and the wafer (18) to bond the two elements together forming a wafered ferrule with embedded mirror (12). The wafer is bonded to its ferrule using an adhesive that is transparent to optical transmissions through the fiber, e.g., a UV-cured epoxy. A second mirror (24) is deposited at the end face of ferrule (14) covering the fiber end. Mirror (24) may cover the entire end face of the ferrule (14) or may be deposited only over the central portion of the ferrule.

Ferrule (14) and wafered ferrule (12) are aligned and held in alignment by alignment fixture (15). The wafer portion of the wafered ferrule can be beveled to assist entry of the wafered ferrule into the alignment fixture. The ferrules are positioned within the fixture so that an optical cavity of length 1 (25) is formed between the opposed mirrors (24) and (22). The optical cavity contains a gap (29 between the second end of the wafer and the mirrored end of the ferrule. The length of the gap can be set to a selected length for fixed filter operation or can be varied in order to change the length of the cavity and, thus, tune the filter. Alignment fixture (15) can for example comprise a PZT transducer system which provides a means for changing the cavity length of the FFP. The FFP (10) of FIG. 2 can, for example be employed in the temperature tunable FFP of FIG. 9.

The ferrule assembly of the present invention contains two ferrules, only one of which is a wafered ferrule. Ferrules can be made from glass, for example Pyrex ®, quartz or ceramic. The term "wafer" is used to refer to a relatively short length of cylindrical rod having an axial fiber there through. The wafer is fixed to the end of a fiber ferrule so that the fibers of the ferrule and the wafer are aligned. Wafers are prepared by cutting or grinding of fiber ferrules and, thus contain two fiber ends. Wafers can be made of the same materials as ferrules. Typically, but not necessarily, the wafer and ferrule in a wafered ferrule are fabricated from the same material. Typical wafer thicknesses range from about 5 microns through hundreds of microns to tens of millimeters, depending on the application. The lengths of ferrules and alignment fixtures are not crucial to operation of FFPs and are typically chosen for convenience of use. Wafers compose a portion of the optical cavity and the length of these elements is chosen based on the wavelength or frequency region of interest for a FFP application.

A wafered ferrule of the present invention is constructed essentially as described in U.S. Pat. No. 5,062,684, which is incorporated by reference in its entirety herein. Briefly, the stripped end of standard coated single-mode fiber is threaded through the axial bore of a ferrule. Typically ferrules are prepared from drawn Pyrex ® capillary cylinders. The protruding end of the fiber is removed to produce a fiber end (or terminus) and the end face of the ferrule with the fiber terminus is polished. A second fiber ferrule is prepared in the same way. A multilayer mirror is deposited on the end face of one of the ferrules covering only the central portion of the end face covering the optical fiber end. This is the ferrule that becomes the ferrule portion of the wafered ferrule. The mirror is preferably a $Si/SiO_2$ multilayer mirror. The polished end of the non-mirrored ferrule is axially aligned end-to-end with the mirrored-end ferrule and the two ferrule ends are fixed together with UV-curable epoxy. A portion of the mirrored ferrule is cut off to begin preparation of the wafer. The portion of the cut ferrule remaining bonded to the other ferrule is ground by machine in successive steps, in increments of 50 microns, to obtain a wafer longer than desired. Grinding is performed such that a flat, smooth surface, which is essentially perpendicular to the fiber axis in the wafer, is achieved. The desired wafer thickness is then obtained by incremental machine polishing of the wafer. The increment used is adapted to the thickness of the wafer. In a preferred embodiment, the wafer is slightly bevelled after the polishing process. It is the thickness of the wafer at or near the axial optical fiber that is chosen for the desired application. To produce wafers with a thickness less than about 40 microns, grinding is stopped when the wafer length is greater than or equal to about 40 microns and incremental polishing is used to obtain the desired length. For wafers thicker than about 40 μm, the wafer thickness at the optic fiber can be measured using a microscope and adjusted, if necessary, by further polishing. Incremental machine polishing is done such that a smooth, preferably defect-free wafer surface which is preferably perpendicular to the fiber axis is obtained. For grinding and polishing of wafered ferrules, positioning devices are used in combination with high precision grinding and polishing machines to accurately and precisely control the thickness of the wafer (in three dimensions to 1/10 of a micron). Precise control of grinding and polishing to achieve a surface perpendicular to the fiber axis is important in avoiding cracking and other defects in the wafer, particularly in the preparation of thin wafers. Production of thin wafers less than about 40 μm is done by incremental controlled-angle polishing to ensure that the wafer surface is perpendicular to the fiber axis. The angle of polishing is controlled to better than about ±0.05. Wafer thicknesses down to about 5 μm can be prepared by these techniques and can be accurately measured using well-known interferometric methods.

Care must be taken with the grinding and polishing of wafers, particularly with those less than about 10 microns in length, to avoid cracking of the wafer or other surface defects. In particular, defects or cracks at, near or across the optical fiber end at the wafer surface should be avoided.

Any type of reflective surface compatible with placement at the faces of fiber ferrules can be employed in the FFPs of this invention. For example, multi-layer, metal oxide, semiconductor or dielectric mirrors can be employed. The reflective surfaces can be deposited on the ferrule end face or fixed to that surface by any appropriate means known to the art. It is desirable to minimize insertional loss and maximize wavelength range in an FFP by using mirror materials and designs that result in low-absorption loss, thin mirrors. This can be accomplished, for example, using multi-layer, low-loss mirror structures with large index differences between layers and a minimum of layers. Multi-layer $Si/SiO_2$ deposited mirrors are preferred in the FFPs of this invention. The rate and temperature of the $Si/SiO_2$ layers is preferably adjusted to maximize the density of the layers deposited, such that the density of the deposited layer approaches the bulk density of the deposited material and such that the porosity of the deposited layer is minimized. Increased density and minimal porosity of the deposited material are associated with better mirror adhesion, increased mirror peel strength and generally improved durability of deposited mirrors. For high finesse, the use of highly reflective mirrors having R ranging from about 95 to 99% is preferred. As will be appreciated by those in the art, the mirror reflectivity can be adjusted to achieve desired optical properties. It has been found that in the single wafered ferrule assembly that the reflectivity of the embedded mirror should be slightly higher than that of the exposed mirror, to minimize insertion loss. The mirrors of an FFP preferably have the same reflectivity. The embedded mirror is, in effect, index matched by its interface with the glass ferrule end face and its reflectivity is thereby reduced. This effect is understood by those in the art who can readily adjust the reflectivity of the mirrors to compensate for the effect. In order to standardize the production of mirrored-end ferrules, the mirrors of all mirrored-end ferrules are deposited only over the central portion of the ferrule end face. In wafered ferrules the mirror need not and preferably does not cover the entire ferule end face. The bonding of the wafer to the ferrule is facilitated by depositing the mirror over the central portion of the face leaving space at the perimeter of the end face for adhesive.

As noted above, the fiber gap present in certain of the ferrule assembly configurations of this invention can be filled with an index matching material. Index matching materials serve to optically couple the fiber. Materials having about the same index of refraction as the fibers are, thus, useful in this invention. Index matching materials in liquid, gel or grease forms are available to the art. Index matching materials include silicone based materials. It is preferred that the index matching material used conform to the dimensions of the gap and to the typically small changes in gap width on tuning. The use, application and operation of index matching materials is generally well-known and understood in the art. Index matching materials may not be suitable in FFP in which it is intended that the cavity length, i.e., the gap in the optical cavity, be rapidly tuned. The index matching material may not be capable of conforming to rapid changes in gap length.

Figure 3:
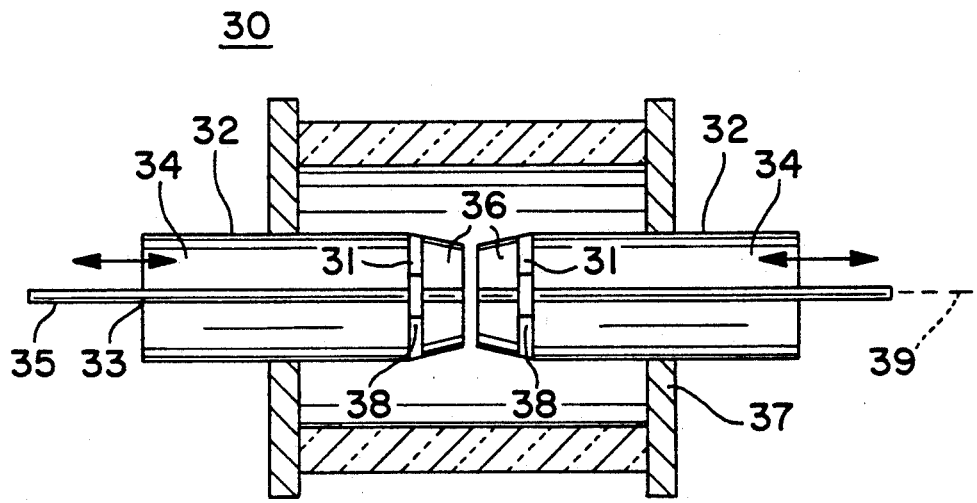
FIG. 3 shows a prior art dual wafered ferrule FFP according to U.S. Pat. No. 5,062,684.

FIG. 3 is a schematic cross-sectional view of a dual-wafered ferrule FFP 30 according to U.S. Pat. No. 5,062,684 (issued Nov. 5, 1991). Two wafered ferrules (32) with wafer (36) and ferrule (34) portions and having an axial bore (33) with optical fiber there through (35) are supported and aligned within an alignment fixture (37) so that the axial optical fibers (35) within the wafered ferrules are aligned. The longitudinal alignment axis is shown as 39. An optical cavity is formed between mirrors (38), deposited at the ferrule end faces and embedded between the wafer and the ferrule. The mirrors do not cover the entire end face to allow bonding of the wafer to the ferrule. The wafers are bonded to the ferrule end faces with a UV-curable epoxy (31). U.S. Pat. No. 5,062,684 refers to fixed FFPs and PZT tunable FFPs.

Figure 4:
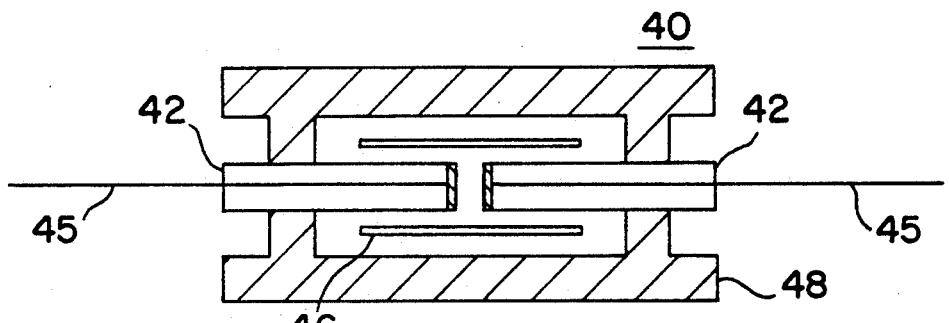
FIG. 4 shows a prior art Type II FFP according to Stone and Stulz (1987) supra.

FIG. 4 is a schematic cross-sectional view of a Type II FFP (40) according to Stone and Stulz (1987) The ferrule assembly of this FFP contains a two mirrored-end ferrules (42) which have an axially disposed optical fiber (45). The mirrored-end ferrules are aligned within an alignment sleeve (46) and supported in an alignment fixture or bracket (48).

Figure 5:
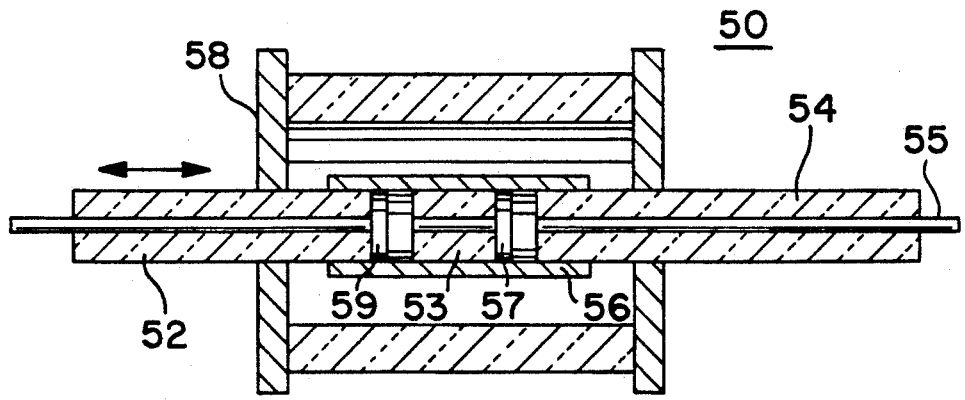
FIG. 5 shows a prior art Type III FFP according to U.S. Pat. No. 4,861,136.

FIG. 5 is a schematic cross-sectional view of a Type III FFP (50) according to U.S. Pat. No. 4,861,136. The ferrule assembly of this FFP contains a ferrule (54), a mirrored-end ferrule (52+59) and an internal waveguide (53), all of which have an axially disposed optical fiber (55) The waveguide is not bonded to either of the ferrules. The waveguide has one mirrored end (57). The ferrule, mirrored-end ferrule and mirrored-end waveguide are aligned within an alignment sleeve (56) and supported in an alignment fixture or bracket (58).

The FFPs of the present invention differ significantly from those of the prior art which is illustrated by a comparison of FIGS. 2-5. The ferrule assemblies of the present invention contain a single wafered ferrule with embedded mirror and a mirrored end ferrule. In contrast, the Type II FFP contains two mirrored-end ferrules, the Type III FFP contains three different ferrule assembly elements: two ferrules, one of which is mirror ended and a mirrored waveguide and the FFP of U.S. Pat. No. 5,062,684 contains two wafered ferrules.

The single wafered ferrule design of the present invention can be adapted to a wider range of cavity lengths and a wider range of optical properties than any of the prior art ferrule assemblies. The single wafered ferrule design can be employed for shorter cavity length (broader FSR) than the Type III or dual wafer ferrule design and can be employed for longer cavity lengths (narrower FSR) than the Type II FFP. For the same cavity length, the gap size of a Type II FFP is larger than that of a single wafered ferrule FFP and losses are considerably higher in the Type II FFP. A single wafered design can be used to meet a wider range of optical specifications. Production of FFPs to meet given specifications is thus facilitated and production costs decreased. The single wafered ferrule assembly, having only two ferrule elements, is also substantially easier to align than the Type III internal waveguide FFP. The Type III FFP requires some form of sleeve or similar device to align and fix the relative positions of the ferrules and the non-bonded internal waveguide. Simpler alignment devices can be employed with the ferrule assemblies of the present invention.

The inventors initially employed a single wafered ferrule assembly to meet a requirement for a short optical cavity length, less than about 10-12 μm, which could not be met by a dual wafered ferrule assembly. Subsequently, it was found that the single wafered ferrule assembly had several additional advantages over the dual wafered ferrule design. The single wafered ferrule design is significantly less sensitive (by a factor of 30) to alignment offset than the dual wafered ferrule design which results in decreased insertional loss, increased ease of manufacture and substantially improved stability. The variation of finesse in FFPs of a given reflectivity is less (about ½) in the single wafered ferrule design. It has also been found that the variation in FSR as a function of wavelength is considerably less in a single wafered ferrule design than in the dual wafered feruule design. These differences are reflected in improved and more easily reproduced optical properties of single wafered ferrule FFPs and significant improvements in manufacture and production.

Figure 11:
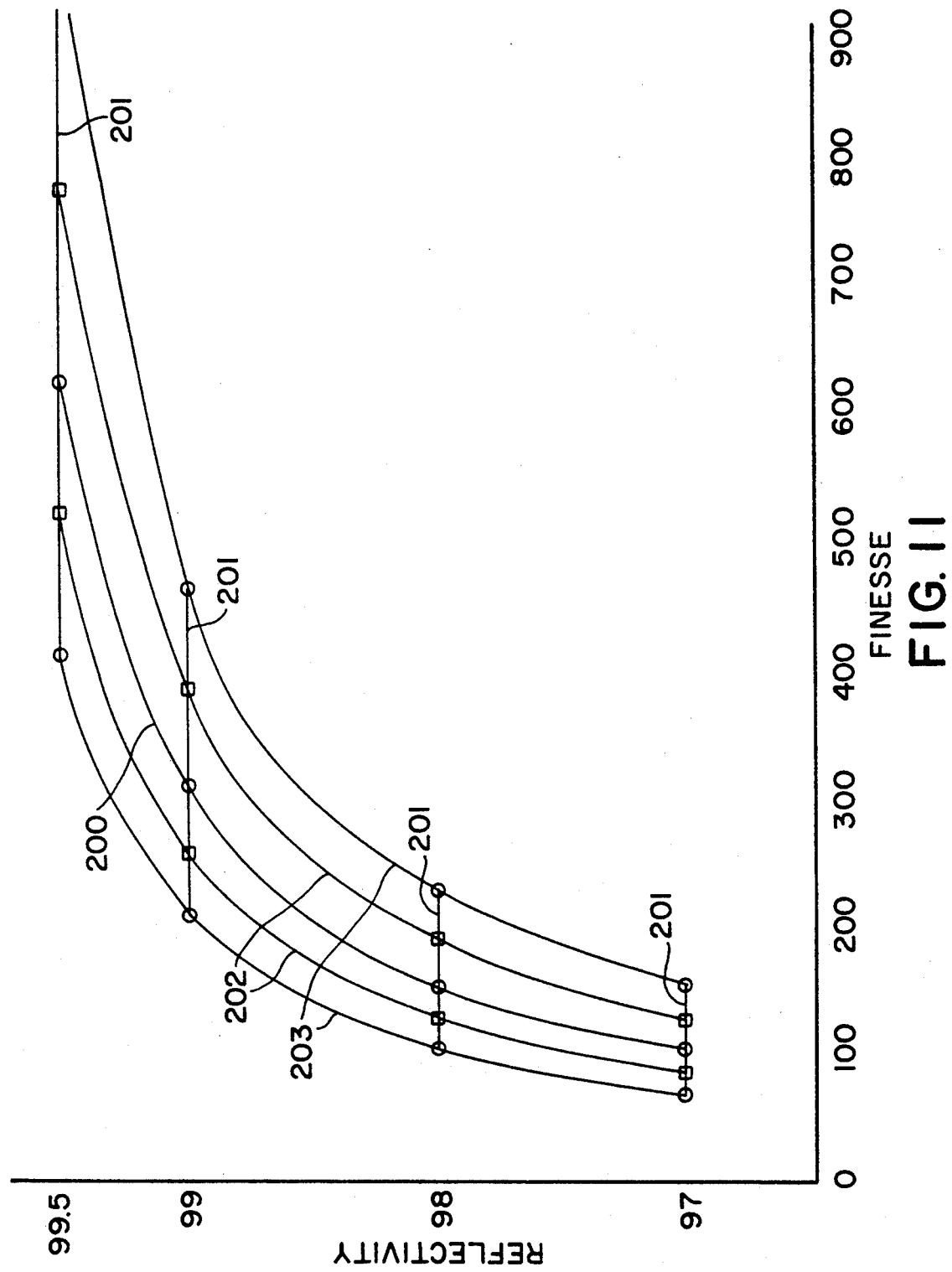
FIG. 11 is a graph based on a mathematical analysis which compares the variability in finesse of dual and single wafered ferrule assemblies as a function of mirror reflectivity. Finesse is plotted as a function of mirror reflectivity.

FIG. 11 is a graph of a mathematical analysis of the potential variation in finesse as a function of reflectivity in a single and dual wafered ferrule design. The graph is based on a four mirror system analysis described in H. Vande Stat and J. M. Muller (1985) J. Opt. Soc. Am. A. 2(8):1363-1370. The curve 100 indicated by closed diamonds is the ideal case in which there is no back reflection from interfaces within the optical resonance cavity. Back reflection at such interfaces can be minimized by employing antireflection coatings. The bars 201 in FIG. 11 indicate the range of variation of finesse for a given mirror reflectivity due to 4% back reflection for each internal interface (assuming glass/air interfaces). The variation in finesse for the dual wafered ferrule assembly is shown by curves 203 indicated by open circles. That for a single wafered ferrule assembly is shown by curves 202 indicated by open squares. The glass/air interfaces (assume to be 4% reflective) within the optical resonance cavity of a ferrule assembly can add to or subtract from the reflectivities of the cavity mirror and affect finesse. The variation in finesse due to such effects increases with the magnitude of the finesse and becomes important at high finesse, i.e., a finesse of about 50 or greater. This variation becomes increasingly more important as the finesse increases to 100, 300, 600 or more. The analysis of FIG. 11 demonstrates that the single wafered ferrule design has significantly decreased (about a factor of 2) variation in finesse for a given reflectivity compared to the dual wafered ferrule design. This decreased variability makes it easier to reproducibly meet a set of optical specifications during production. Production yield is improved and manufacturing costs are decreased.

An anti-reflection (AR) coating might be employed in an FFP to minimize the variability of finesse with reflectivity. Adding an AR coating to the internal wafer surfaces requires a deposition process, increases the complexity and cost of manufacture of FFPs and should be avoided if possible. The variation in finesse is small enough with the single wafered design that AR coatings are not necessary. The use of AR coatings, aside from requiring another coating operation, does not allow any adjustment of the optical parameters of the FFP. Some means is necessary to allow adjustment of the filter for varying mirror reflectivities, varying alignment loss and other parameters that cause a significant variation in finesse. Adjustment of wafer length is presently used as the primary means for optical parameter adjustment.

Employing AR coatings makes such wafer length adjustments impractical. The variability in finesse in the single wafered ferrule design is large enough to be of use in adjusting a single wafered ferrule FFP to meet a set of optical specifications.

Figure 12:
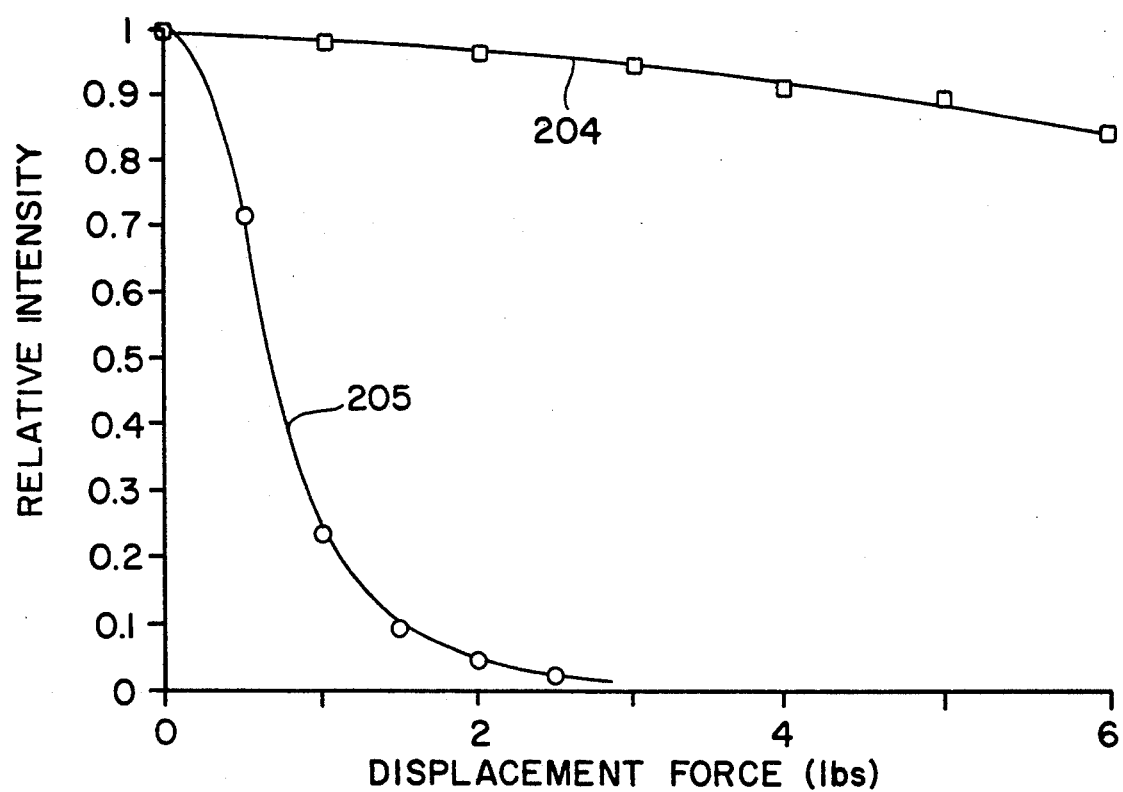
FIG. 12 is a graph comparing the sensitivity to alignment offset or misalignment sensitivity of a dual wafered ferrule (open circles) fixed FFP and a single wafered ferrule (open squares) fixed FFP. Intensity through the filter is measured as a function of lateral displacement force (in lbs) used to induce alignment offset.

FIG. 12 illustrates the significantly reduced alignment offset sensitivity of the single wafered ferrule design compared to the dual wafered ferrule design. Single and dual ferrule assemblies were aligned in the same alignment fixture which was analogous to that described in EP 457,484, to generate the FFPs examined in FIG. 12. A single wafered ferrule FFP, having a wafer 0.488 mm long and a dual wafered ferrule FFP, having wafer lengths of 0.1295 and 0.1328 mm, were compared. A calibrated spring was used to apply a transverse displacement force of up to 6 lbs to the FFPs. The actual offset induced by the force is not known, but offset is assumed to increase with increasing displacement force. The actual offset induced in this experiment is believed to be on the order of tenths of a micron. As seen in FIG. 12, the single wafered ferrule FFP shown in curve 204 was about 30 times less sensitive to transverse offset as measured by the relative intensity of transmission than the dual wafered ferrule FFP shown in curve 205.

Figure 13A:
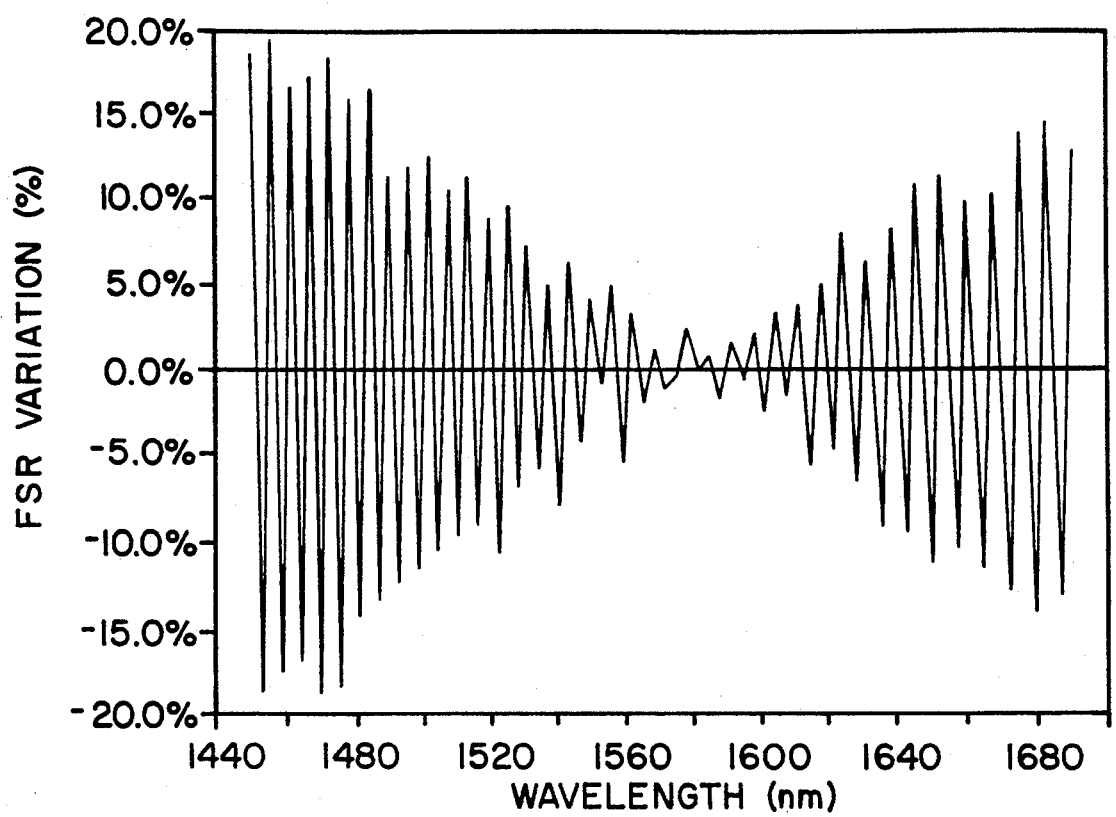
FIGS. 13A and 13B compare the variation of FSR (in %) as a function of wavelength (over 1440–1700 nm) in a dual wafered ferrule assembly in FIG. 1A (view A) in FIG. 13B a single wafered ferrule assembly.
Figure 13B:
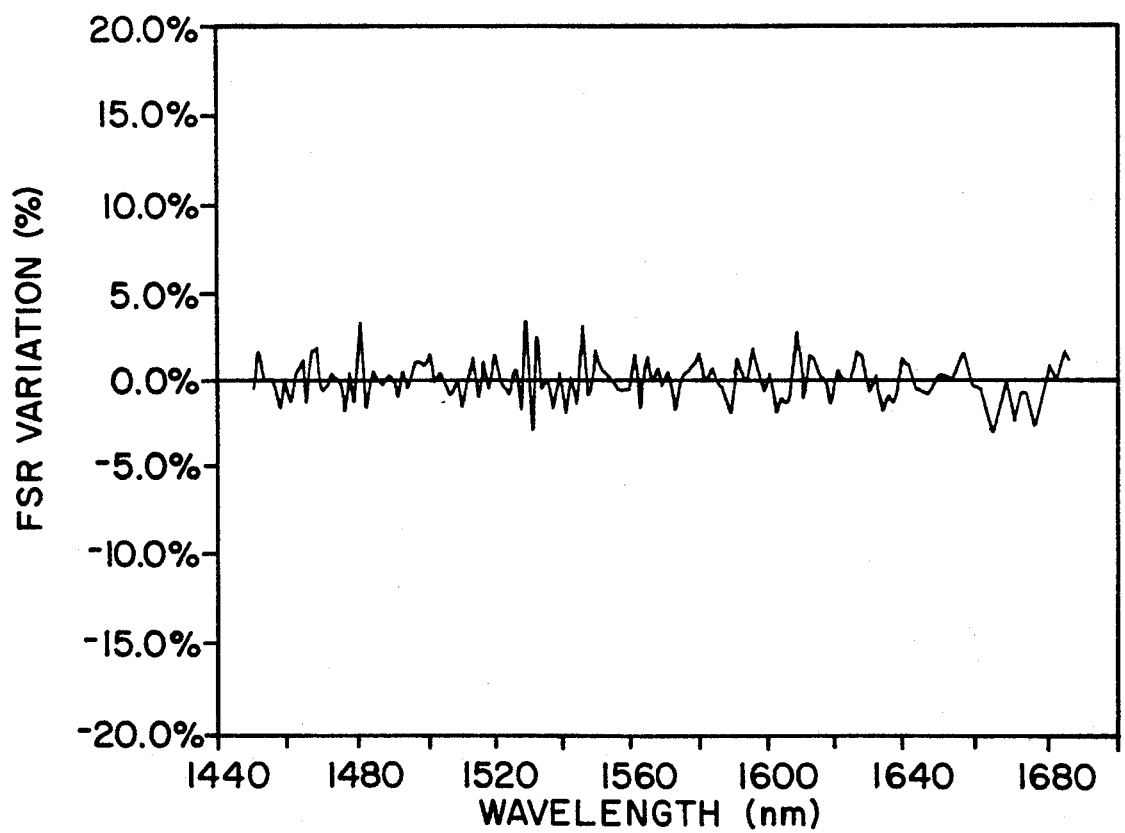

FIG. 13 compares the variation in FSR (as a % of FSR) as a function of wavelength (1.44 to 1.70 μm) for a dual wafered ferrule FFP in FIG. 13A and a single wafered ferrule FFP in FIG. 13B. The same FFPs compared in FIG. 12 were used in this comparison. Variation of FSR with wavelength was measured using an optical spectrum analyzer and a broadband LED source centered at 1.55 μm (1550 nm) and usable from about 1.45 to 1.70 μm as the input. The dual wafered ferrule FFP exhibits remarkably greater variation in FSR than the single wafered ferrule FFP over the wavelength region examined. The FSR variation of the single wafered ferrule FFP over the 1.45 to 1.70 μm range was less than about 5%. Similar low FSR variation (less than about 5%) is expected over the wavelength range 1.3 to 1.7 μm. FSR variation of the dual wafered ferrule FFP was low at the middle of the wavelength range and approached 20% at the ends of the range examined. These results indicate that the single wafered ferrule FFP will exhibit significantly less FSR variation than a comparable dual wafered ferrule FFP over its entire operable wavelength range.

It should be noted that this comparison was made with a single wafered ferrule with a wafer length considerably longer than the summed wafer lengths of the dual wafered ferrule FFP. Since the FSR non-uniformity and sensitivity to offset are worse for longer wafers, the comparison of FIG. 13 should favor the dual wafered ferrule FFP.

As will be appreciated by those in the art, chromatic dispersion, waveguide dispersion, inaccuracies in spectrum analysis, and errors in measurement can add to the measured variation in FSR as a function of wavelength. Methods for the minimization of such dispersion effects and inaccuracies are well-known in the art. It is believed that the significantly increased variation in FSR with wavelength observed with the dual wafered ferrule FFP is intrinsic to that design. It is believed that the variations observed and the pattern of those variations results from the presence of a second, albeit low reflectivity, FP cavity formed between the wafer end faces inside of the FP cavity of the dual wafered ferrule design.

It is also well-known in the art that the wavelength range over which a FFP is operable (operable wavelength range) is limited by the wavelength dependence of the mirrors employed.

The minimal variation in finesse as a function of wavelength and reflectivity in the single wafered ferrule FFPs increase their suitability for use in applications that require high finesse. The FFPs of the present invention are suitable for use in applications requiring finesse over about 50. They are more suited than prior art FFPs to applications requiring finesse over about 100, and particularly more suited than prior art FFPs to applications requiring finesse over about 600. A specific high finesse application for which the FFPs of this invention are particularly well suited is for use in multiple access computer networks (see Miller and Janniello (1990) Electronics Letters 26:2122). In this application, the filter is used for switching among channels in the computer network and the maximum number of channels that can be accommodated is approximately equal to F/2. High finesse FIPs will be useful in the development of such multi-access systems which will accommodate large numbers of channels.

The single wafered ferrule assembly of this invention can be employed in fixed or tunable FFPs. Tunable FFPs include those in which the optical path length in tuned by changing the index of refraction of the optical cavity and those in which the cavity length can be changed by use of transducer systems, such as PZT systems, or by changing the temperature of the FFP.

The term temperature tunable is used to refer to FFP filters in which the wavelength or frequency of the transmission output of the filter is changed, shifted or tuned by changing the temperature of the FFP. In the temperature tunable FFPs of this invention, changing the temperature of the alignment fixture of the FFP changes the length of the resonance cavity of the filter and changes the wavelength or frequency of transmissions of the filter. The maximum tuning range of an FFP filter is the FSR. A filter that is broadly tunable herein refers to one that is tunable over a substantial portion of the FSR, e.g., greater than about 85% of a FSR, with a relatively small change in temperature, e.g., a change of 20° to 30° C. A wavelength or frequency trimmable FFP is a narrowly tunable filter, for example tunable over less than about 30% of a FSR, with a larger temperature change of greater than about 30° C. The term temperature tunable includes the extremes of narrow and broad tuning of wavelength and frequency and also includes ranges intermediate between these extremes. Preferable for use as a wavelength or frequency tunable or trimmable FFP is a filter that can be tuned over a minimum of 5% of a FSR with a temperature change of about 20° to 30° C.

The term fixed FFP refers to FFPs intended to be operated at substantially constant optical cavity length between the Fabry-Perot mirrors. Often such fixed FFIs will require a means for maintaining a substantially constant cavity length in spite of temperature fluctuations. Thermal insulation and temperature compensation schemes can be employed to limit the variation of cavity length with variations in ambient temperature. A temperature tunable FFP may, for example, be combined with temperature sensing and heater/cooler control circuits to maintain a substantially constant temperature of the FFP. In this case, the temperature controlled FFP can function essentially as a fixed FFP. Fixed cavity length FFPs can function for wavelength or frequency tuning by changing the index of refraction of the material filling the gap along the cavity length.

The term alignment refers to axial alignment of optical fiber ends of sequential ferrule assembly elements. The longitudinal axis of the ferrule or wafered ferrule, its long axis, is the axis along which the optical fiber is positioned. Ferrules and wafered ferrules are aligned within alignment fixtures by use of the rotary alignment technique as described, for example, in U.S. Pat. No. 4,545,644. The optical fibers are aligned by rotating the fiber ferrules relative to each other to obtain maximum transmission through the fibers of the FFP at a chosen wavelength or frequency. The FFPs of this invention have a gap within the optical cavity. The gap is typically "tuned", i.e., the initial gap spacing in the ferrule assembly is set, to a desired initial wavelength (or frequency) by slightly varying the gap length during ferrule rotation to obtain transmission at the desired wavelength (or frequency). The initial gap is typically set when the ferrule assembly elements are aligned. In temperature tunable FFPs, the gap width is set to accommodate the desired range of cavity length tuning. For example, if it is desired to tune over a FSR at a wavelength of 1.5 μm, it is desirable to set the initial gap of the FFP so that the cavity length can be decreased by at least about 0.75 μm. The initial gap should preferably be set at less than about 2 μm-3 μm to minimize diffractive loss, see below.

The term alignment fixture refers to a fixture which functions to hold the aligned elements of a ferrule assembly in rigid axial alignment. The alignment fixture, sometimes called a supporting structure, has a means for receiving ferrules and wafered ferrules such as a passage within the body of the fixture so that the ferrule assembly elements can be axially aligned. The alignment passage itself is constructed to high tolerance and can be formed, for example, by high precision machining through a fixture body to result in a substantially cylindrical, substantially smooth, substantially straight passage or by combining alignment elements, like alignment rods, to form a substantially straight, substantially smooth passage which will accommodate cylindrical ferrule assembly elements. The alignment fixture also has an adjustable means for holding the aligned ferrule assembly in rigid contact with the body of the fixture. Alignment fixtures that are useful in temperature trimmed or tunable FFPs allow the length of the optical cavity of the FFP to vary with temperature without substantial detriment to axial alignment of the ferrule assembly. Misalignment or offset of fibers in the ferrule assembly can result in transmission losses. Fibers are aligned to minimize this loss. Most preferably, no change in fiber alignment will occur during temperature tuning of the FFPs of the present invention. It will be appreciated that it is more preferred to minimize any changes in fiber alignment with tuning. However, a small change in alignment resulting in a small loss (or gain) in transmission can occur during tuning without substantial detrimental effect on the operability of an FFP in a particular application. Thus, the amount of misalignment acceptable for a temperature tuned FFP is dependent on the constraints imposed by its intended application. The fixed and temperature tunable FFPs of the present invention are designed to be low-loss, i.e., having less than or equal to about 3 dB loss. As will be appreciated by those in the art, intensity losses in an FFP can be due to many factors (see J. Stone and L. W. Stulz (1987) supra and D. Marcuse and J. Stone (1986) J. Lightwave Technol. LT-4, pp. 377-381) including diffraction and absorption at the mirrors as well as to misalignment of the fibers. It will, thus, also be appreciated that obtaining a low-loss filter will require minimization of all such losses. Means for minimizing losses which are not the result of fiber misalignment within a FFP cavity are well-known in the art.

The terms "high precision" or "to high tolerance" as employed herein are used in reference to alignment fixtures and refer to machining to a minimum precision of about 0.0001 inch (1/10 mil).

The term optical as used in "optical fiber", "optical cavity" or "optical transmission", herein, refers to electromagnetic radiation having a wavelength such that the radiation can be transmitted by means of dielectric fibers with loss less than 25 db/Km. Presently, wavelengths in the range of 400 to 2,000 nm can be transmitted by optical fibers.

The term "high finesse," with reference to the optical characteristics of an FFP filter, relates to filters having a finesse of 50 or more.

Figure 6:
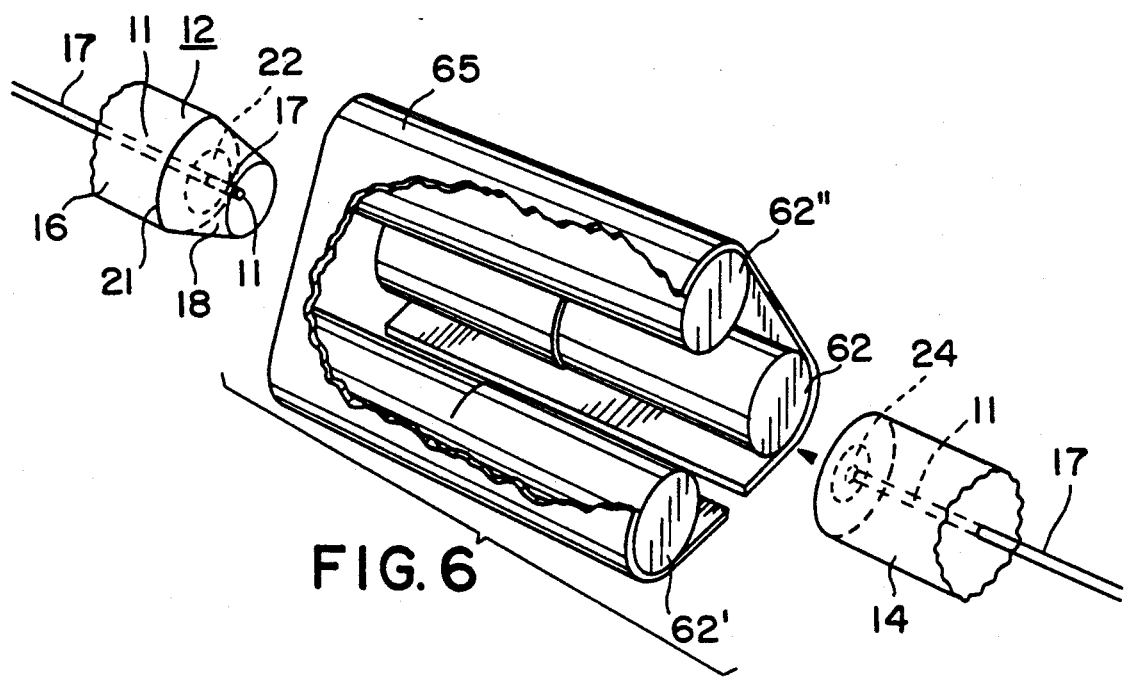
FIG. 6 shows schematically, in partial cut-away view, an exploded exemplary FFP according to this invention with a single wafered ferrule assembly and a rotary mechanical splice alignment fixture.
Figure 7:
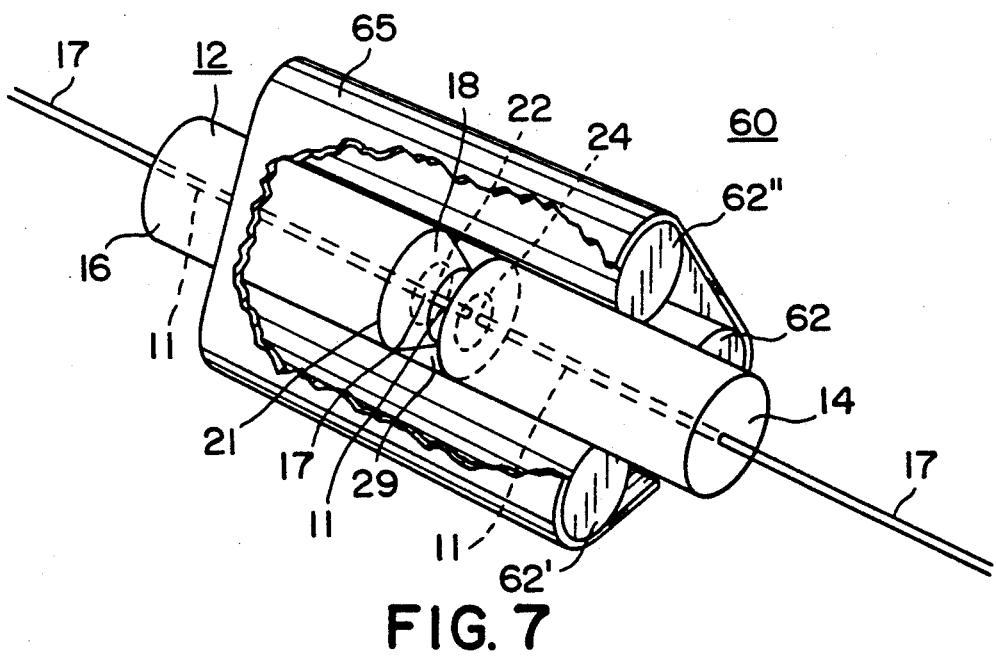
FIG. 7 shows schematically, in partial cut-away view, the exploded FFP of FIG. 6 with wafered ferrule and ferrule in operable position within the rotary mechanical splice alignment fixture.

The FFP (60) of FIGS. 6 and 7 is a specific embodiment of a fixed FFP of this invention having a single wafered ferrule assembly aligned within a rotary mechanical splice alignment fixture. The numbering of FIGS. 6 and 7 is consistent with that of FIG. 2. FIG. 6 shows the essentially cylindrical alignment rods of the rotary mechanical splice fixture (62, 62' and 62") in the three corners of a triangular alignment bracket (65). The alignment rods provide multi-point support for the ferrules (12) and (14) inserted into the sleeve or passage formed by the alignment rods. The ferrule (14) and wafered ferrule (12) are inserted into the alignment fixture as shown in FIG. 7. The wafered ferrule and the ferrule are aligned by a rotary alignment technique. The spacing of the end faces is adjusted to form a gap (29) which is a portion of the optical path length. The gap is adjusted to maximize transmission of a desired wavelength or frequency. The gap in a fixed FFP can be filled with an index matching material.

The term rotary mechanical splice refers to a particular ferrule alignment fixture as described in U.S. Pat. No. 4,545,644, with particular reference to FIG. 3 therein. U.S. Pat. No. 4,545,644 is incorporated, in its entirety, by reference herein. Rotary mechanical splice alignment fixtures comprise a plurality of, preferably three, alignment rods held within a spring bracket. At least one of the rods, preferably two in a three-rod splice, includes a "flat" as defined in U.S. Pat. No. 4,545,644, extending along the rod from one end for a substantial fraction of the length of the rod. Typically, the flat extends over about one half of the length of the rod, but unsymmetrical rods will function equivalently. Ferrule assembly elements, including two ferrules and/or wafered ferrules are inserted into the splice and aligned therein essentially as described for insertion and alignment of capillary cylinders in U.S. Pat. No. 4,545,644. The spring bracket holds the ferrule assembly elements in rigid contact with the alignment rods which constitute the body of the fixture. For operation of the rotary mechanical splice for alignment, an inserted ferrule must be in rigid contact only with the flat portion or the cylindrical portion of any one alignment rod.

The structure and operation of the rotary mechanical splice alignment fixture for alignment of ferrules has been described in U.S. Pat. No. 4,545,644. The use of a rotary mechanical splice alignment fixture for fixed and tunable FFPs was described in U.S. patent application Ser. No. 07/801,450. Alignment rods (62) and (62') carry flats as shown in FIG. 6. Wafered ferrule (12) contacts the flat of alignment rod (62') and ferrule (14) contacts the flat of alignment rod (62). Both ferrules preferably have substantially the same outside diameter. A rotary mechanical splice alignment fixture can be modified to accommodate ferrules of different diameters. The outside diameter of at least a portion of the wafer (18) is typically less than that of the ferrule to which it is bonded to facilitate entry of the wafered ferrule into the alignment fixture. In the rotary mechanical splice fixture the portion of the wafer over which the diameter is reduced, compared to the ferrule, is not in rigid contact with the body of the alignment fixture.

The FFPs of the present invention in which the ferrules and wafered ferrules are aligned in a rotary mechanical splice alignment fixture and which contain a fiber gap in the optical cavity can be tuned or trimmed by inserting into the gap along the optical cavity a material having a controllable index of refraction, i.e., which can be changed in a controlled fashion. Changing the index of refraction of the material within the gap results in changing of the optical path length of the cavity ($nl_c$) without changing the distance between the mirrors. Electro-optic materials, like $LiNbO_3$ or liquid crystals, magneto-optic materials, like CdS, and thermo-optic materials, like glycerin or liquid crystals, which respectively, exhibit variations in index of refraction as a function of variation in an applied electric, magnetic field or on variation in temperature, can be introduced into the optical cavity of the FFPs of this invention. The use of such materials in conventional Fabry-Perot filters are well known in the art (see A. Yariv and P. Yeh (1984) "Optical Waves in Crystals", John Wiley and Sons, Inc, New York). For example, K. Hirabayashi et al. (1991) IEEE Photonics Technology Letts. 3(8):741-743 has described the use of a electro-optic material, a nematic liquid crystal, for the tuning of a FP filter. Electro-optic and magneto-optic materials can be employed in FFPs of this invention to produce FFP optical modulators.

The FFPs of the present invention in which the ferrules and wafered-ferrules are aligned with rotary mechanical splice alignment sleeves can be tuned by selectively varying the temperature of the FFP. Changing the temperature of the filter changes the cavity length as the component parts of the FFP expand or contract with changing temperature. The FFP can be heated, for example using a resistive heating element. Alternatively, the FFP can be heated or cooled relative to an external reference temperature using a thermoelectric heater/cooler (THC) such as the commercially available Frigichip ® heat pump (Melcor, Trenton, N.J.). One or more heating or cooling elements are placed in thermal contact with the FFP, for example, by mechanical or adhesive bonding of the heating element to the spring bracket of the rotary mechanical splice. The heating or cooling unit can optionally be enclosed in an insulating housing to minimize heat loss. The heating or cooling unit can be optionally combined with a means for sensing the temperature of the FFP and a means for controlling the heating or cooling unit which function in concert with the unit to maintain the device at a chosen temperature or regulate the temperature of the device.

Figure 8:
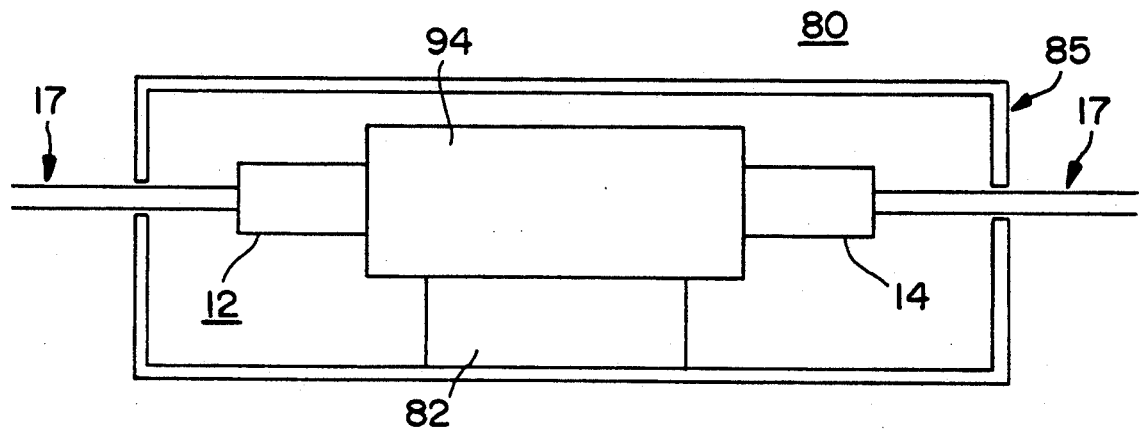
FIG. 8 schematically shows a cross-sectional view of the positioning of a electrical heater/cooler in the temperature tunable FFPs of the present invention.

FIG. 8 provides a schematic diagram of the placement of a THC (80) in thermal contact with an FFP of this invention. As shown, the device is provided with a housing (85), from which fibers (17) exit, the THC is placed in thermal contact with the FFP and the housing. The housing is at a reference temperature $T_R$. The FFP is not in direct thermal contact with the housing. Passage of a current through the THC heats or cools the FFP relative to $T_R$, as is understood in the art. The THC temperature controlled FFPs may be provided with a means for maintaining $T_R$ substantially constant or means for avoiding substantial changes in $T_R$. Both resistively-heated FFPs and THC-heated or cooled FFPs can also be provided with temperature sensing means and control circuits which function with the heater or heat pump to maintain the FFP at a selected temperature or within a selected temperature range.

For an FFP a cavity length thermal coefficient, $a_{lc}$, reflecting the change in cavity length/C.° can be defined. The larger this coefficient is, the greater is the change in cavity length exhibited by the FFP with a change in temperature. A positive coefficient, as is conventional, indicates that cavity length will increase with temperature. The absolute magnitude and sign of this coefficient will depend on the materials employed in the FFP and the specific structure of the FFP and its alignment fixture. A larger absolute magnitude of thermal coefficient is associated with an FFP in which the alignment rods of the rotary mechanical splice sleeve are made of a different material than the ferrules and wafers due to the different thermal expansion coefficients ($a$) of the two materials. For example, the ferrules and wafered-ferrules can be made of quartz while the alignment rods are made of Pyrex ®, stainless steel, brass or other suitable material. Thus, to achieve increased cavity length changes for z given temperature change, it is preferred that the alignment rods and/or the spring bracket of the rotary mechanical splice be made of a material having a different $a$ than that of the material of the ferrules and wafers. In exemplary embodiments, the ferrules and wafers are Pyrex ®, while the alignment rods are stainless steel, brass or some other suitable material. Alternatively, the ferrules and wafers are quartz, while the alignment rods are Pyrex ®, stainless steel, brass or other suitable materials. For broader temperature tunability, it is preferred to employ alignment rods and spring brackets having large positive thermal expansion coefficients. Those of ordinary skill in the art know how to select materials having $a$ appropriate for use in the FFPs of the present invention. The term thermal expansion coefficient, as used herein, has its conventional art recognized meaning. A large positive thermal expansion coefficient refers to an $a$ greater than or equal to about $10 \times 10^{-6}$/° C.

Figure 9A:
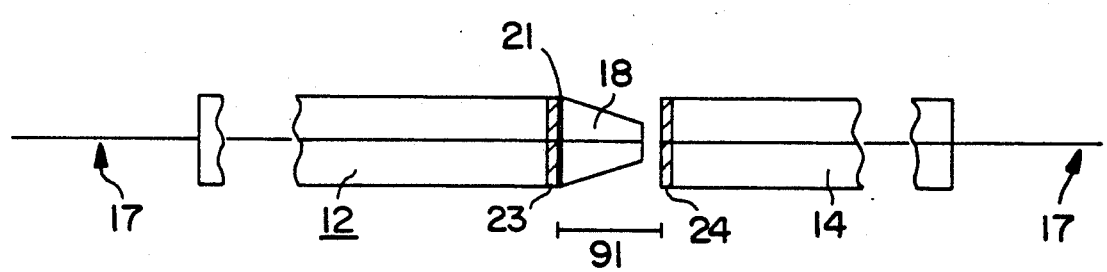
FIGS. 9A and 9B schematically show exemplary ferrule configurations according to this invention. The figures schematically demonstrate how the length of the contact between a ferrule and the body of the alignment fixture can be changed.
Figure 9B:
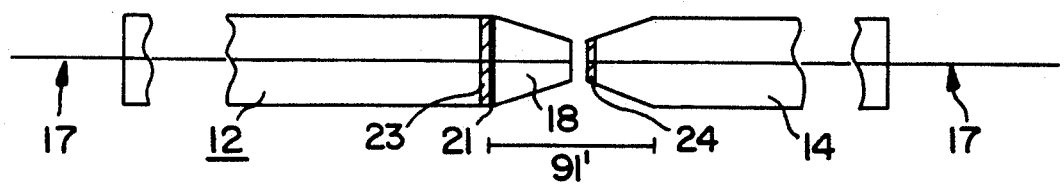

The wafer portion of the wafered ferrules described above is typically ground and polished such that the wafer portion has an outer diameter that is smaller than that of the ferrule to which it is bonded. This is done to ensure that no portion of the wafer edge extends past the outer diameter of the ferule portion in the aligned wafered ferrule. (After fiber alignment the outer diameters of the wafer and ferrule may not be aligned.) As a result, the wafer portion of the wafered ferrule is, typically, not in rigid contact with the alignment rods of the alignment sleeve. The wafer portion of the wafered ferrule can, thus, expand or contract with temperature change essentially independent of the alignment rods. The $a_{lc}$ of the FFP can be changed by varying the length of the wafers and/or ferrules not in rigid contact with, i.e., decoupled from, the alignment rods. FIG. 9 shows how the contact length of ferrules with the body of an alignment fixture can be varied. The length of the ferrules decoupled from the fixture body is shown in FIG. 9A as 91 and 91 in FIG. 9B as 91'. FIG. 9 compares two exemplary ferrule assembly configurations, that of FIG. 9A to that of FIG. 9B, employing a wafered ferrule with embedded mirror and a mirrored-end ferrule. In FIG. 7A, the outer diameter of the wafer is less than that of the ferrule portion of the wafered ferrule and the length decoupled from the fixture body is 91. In FIG. 7B, the length of the ferrules not in contact with the fixture body, 91', is increased compared to length 91, by also decreasing the outside diameter of a portion of mirrored-end ferrule (14). In FIG. 9B, the end portion of 14 can expand or contract essentially independent of the alignment rods. The length of the end portion of the ferrule or wafered ferrule that is not in rigid contact with the alignment rods can be varied to change the cavity length thermal coefficient; however, the modification of the ferrules must not interfere with the alignment function of the rotary mechanical splice fixture. In a standard 10 mm length rotary mechanical splice alignment fixture, preferably at least about a 3 mm length of each ferrule is in rigid contact with the fixture body.

Figure 10:
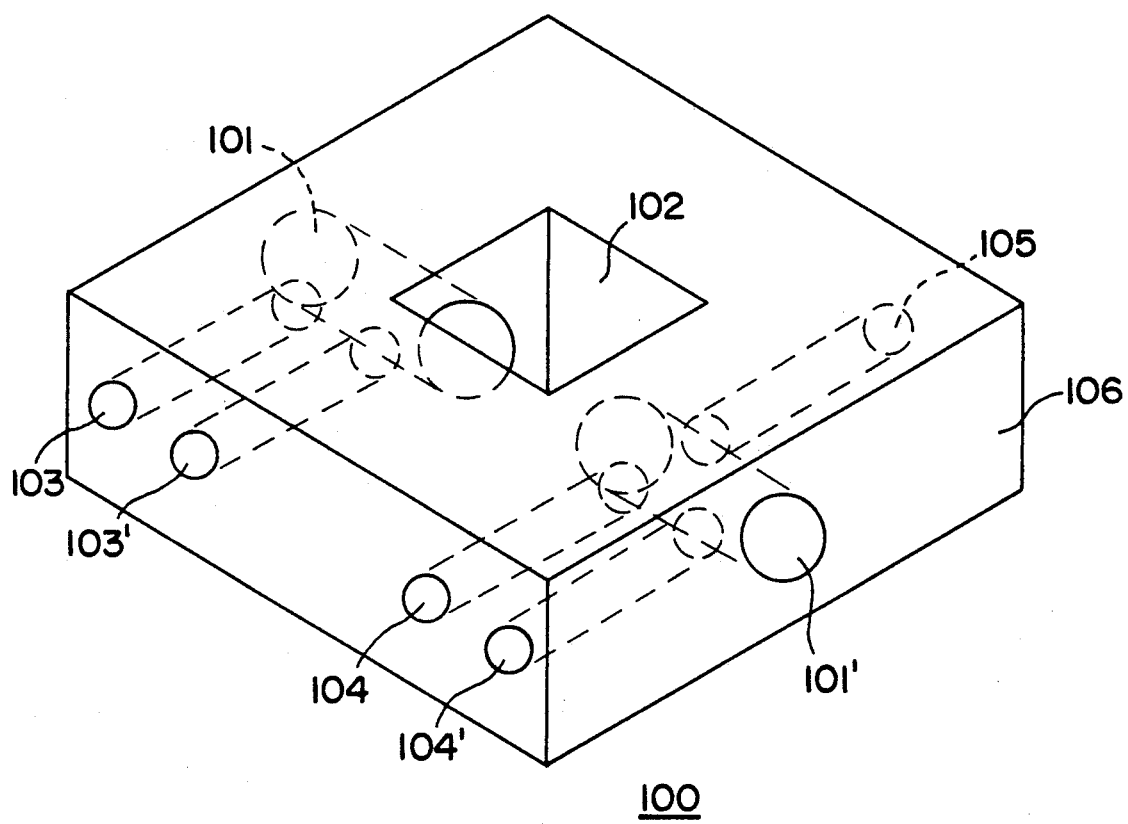
FIG. 10 is a schematic diagram of an exemplary temperature tunable FFP alignment fixture which allows broad temperature tuning.

A second FFP alignment fixture suitable for use in combination with the single wafered ferrule assembly of this invention in temperature tunable FFPs and particularly useful for broad temperature tuning applications is schematically shown in FIG. 10. This alignment fixture was described in U.S. Ser. No. 07/801,450 (now allowed). This fixture provides alignment of inserted ferrule elements to the high tolerance required to achieve low-loss and broad temperature tuning of the FFP substantially over an FSR with no significant detrimental effect on operability of the FFP. The alignment fixture of FIG. 10 has a cylindrical alignment passage extending through the body of the fixture, 101 and 101', for receiving the ferrule assembly. In this case, the alignment passage is in two portions. The alignment passage of the exemplified fixture is interrupted by a cavity extending through the center of the fixture, 102, perpendicular to the axis of the alignment passage. This cavity allows the central portion of the ferrule assembly to be seen to assist in adjustment of alignment and functions to interrupt the alignment passage to provide a region in which the expansion and contraction of the ferrules and wafered ferrules is decoupled from that of the fixture. The exemplary fixture of FIG. 10 has a passage which is in two portions (101 and 101'). These two ends of the passage must be aligned to each other with high precision. High precision machining processes are well known in the art. For example, wire electron discharge machining (EDM) can be used to create the high precision passage of FIG. 10.

The alignment fixture has a one-piece body (106) provided with a means for holding the ferrules in rigid contact with the fixture body. Specifically provided in FIG. 10 are a plurality of threaded screw holes which extend through the body of the fixture into the alignment passage and which are provided with screws which on being tightened can contact and hold a ferrule in place within the passage. Each ferrule or wafered-ferrule is preferably held with at least two such holding screws. FIG. 10 shows the positioning of two such holding screw means (103, 103' and 104, 104') for each of the ferrules of the ferrule assembly. The holding screws are preferably positioned so that they all enter the passage from the same side of the body as indicated in FIG. 10 to hold the ferrules against the side of the passage. The screws employed for holding the ferrules rigidly in place, are preferably tipped with a soft metal such as copper to avoid scratching of the ferrule assembly elements. The region in which the expansion and contraction of the ferrules is decoupled from that of the alignment fixture extends between the innermost positions at which the ferrules are held to the body, in FIG. 8 between holding screws 103 and 104.

The alignment fixture is also provided with a means for adjusting the alignment of one or both of the ferrule elements in the alignment passage. In FIG. 10, a threaded screw hole is shown which extends through the body of the fixture into the alignment passage, 105. An alignment screw positioned and tightened into this threaded hole will extend into the passage and contact a ferrule inserted within the passage. The relative axial alignment of the ferrules within the passage is adjusted by changing the length of the adjustment screw that extends into the passage. As indicated in FIG. 10, the adjustable alignment screw is positioned so that the screw enters the alignment on the opposite side from the holding screws. To maximize the magnitude of $\alpha_{lc}$ for this FFP, the body of the alignment fixture is preferably fabricated from a material having a high positive thermal expansion coefficient, such as a metal, for example stainless steel. The holding screws and the alignment screw are fabricated of a material that is compatible for use with the material of the body and the screws are preferably tipped with a deformable material such as copper to avoid scratching of the ferrules.

In a preferred exemplary temperature tunable FFP, a wafered ferrule with embedded mirror and a mirrored-end ferule are introduced into the alignment passage of the alignment fixture of FIG. 10. The ferrules are positioned within the passage and spaced and aligned with respect to each other to maximize transmission of an optical signal of a desired wavelength through the FFP. A small gap (typically about 1 μm or less, but not more than about 2-3 μm) is left between the faces of the ferules to allow for variation of the cavity length. Alignment is performed using the conventional rotary alignment process. Briefly, the ferrules are partially fixed in the passage, with a desired small spacing between the ferrules. The ferrules are then iteratively rotated with respect to each other preferably to achieve a maximal transmission through the optical fiber of the FFP. Once the desired rotary alignment has been obtained the holding screws are fully tighten to rigidly hold the ferrules in place. Adjustment of the alignment adjustment screw may then result in an improvement of ferrule assembly alignment.

The alignment fixture of FIG. 10 is preferred for use in temperature tunable FFPs having a means for changing the temperature of the FFP. A temperature tunable FFP employing the alignment fixture of FIG. 10 can be adapted to fixed wavelength or frequency operation by providing the FFP with temperature sensing and control means.

A thermoelectric heater/cooler (THC) is placed in thermal contact with the body of the alignment fixture, like that of FIG. 10, of a FFP. By placing an appropriate current through the THC, as is known in the art, the temperature of the FFP can be changed, either increased or decreased, with respect to a reference temperature. The temperature tuned FFP is preferably provided with a housing which surrounds the FFP with attached THC. The housing is in contact only with the THC and not in thermal contact with the alignment fixture or ferrules of the FFP. The exemplary temperature tunable FFP described hereinabove can also be provided with a temperature sensing means and control circuit which function together to control current passing through the THC and to allow the temperature of the FFP to be controlled at a desired temperature. The exemplary temperature tunable FFP aligned using the alignment fixture of FIG. 10 and being provided with a THC device is broadly tunable over more than 85% of an FSR.

Any means for holding the ferrules in position in the alignment passage can be employed. It is preferred that means be adjustable to allow for readjustment of alignment and changing the initial gap width.

The alignment fixture of FIG. 10 and the rotary mechanical splice alignment fixture have several functional features in common for use in temperature tuning or trimming FFPs. They both provide a means for rigid alignment of the fibers of the ferrule assembly. Furthermore, the fixtures allow for the introduction of a region in which the expansion and contraction of the ferrules is decoupled from that of the fixture. The length of this decoupled region can be changed in the rotary mechanical splice as exemplified in FIG. 9 by altering the structures of the ferrules and/or wafered ferrules. The length of this decoupled region can be changed in fixtures like that of FIG. 10 by charging the distance between the ferrule holding means which hold the ferrules to the fixture.

In broad tuning applications, it is most preferred that an FFP be tunable over a full FSR. Such a tunable filter can be constructed combining the expedients described herein for increasing the tuning range. It is preferable to minimize power and thermal insulation requirements so that the full tuning range (FSR) is accessible with a modest temperature change, e.g., of about 50° C. and more preferably with a temperature change of 20° C. to 30° C.

In addition to those alignment fixtures specifically described herein, the single wafered ferrule assemblies of the present invention can be employed in combination with any FFP alignment sleeves, alignment fixtures or support elements. In particular, single wafer ferrule assemblies can be employed in combination with the ferrule end support means and the PZT system of EP 457,484, published Nov. 21, 1991 which refers to U.S. Ser. No. 525,417 (now U.S. Pat. No. 5,073,004). These applications are incorporated by reference in their entirety herein.

One of ordinary skill in the art will appreciate that the configurations, materials and techniques specifically described and exemplified herein can be modified, altered or adapted to achieve the objectives of this invention. All such alterations and modifications that embody the principles of this invention are encompassed within the spirit and scope of this invention.

We claim:

1. A fiber Fabry-Perot filter (FFP) having:
   a. a fiber ferrule assembly through which an optical fiber extends and which has an optical resonance cavity along a length of said optical fiber, said assembly comprising a first and a second ferrule each of which has a substantially axial bore therethrough in which a portion of said optical fiber is positioned, and a first and a second mirror positioned to interrupt said optical fiber and thereby form said resonance cavity, said mirrors located in parallel planes with respect to one another, said planes substantially normal to the axis of said length of optical fiber, said first ferrule is a wafered ferrule comprised of a wafer with a first end and a second end, said first end bonded to said first ferrule to form a wafer portion of said wafered ferrule, said first mirror embedded between said first ferrule and said first end of said wafer, said wafer portion thereby residing within said resonance cavity, said second ferrule is a mirrored-end ferrule having no wafer bonded thereto but having said second mirror deposited on an end thereof, said cavity containing a gap located directly between said second mirror and said second end of said wafer, and
   b. means for holding said ferrules in an aligned relative axial relation to one another such that an optical signal can be transmitted through the optical fiber of said assembly.

2. The FFP of claim 1 wherein said wafer portion of said wafered ferrule is beveled.

3. The FFP of claim 1 wherein said wafer portion of said wafered ferrule is less than about 10 microns in length.

4. The FFP of claim 1 wherein said wafer portion of said wafered ferrule is greater than or equal to about 10 microns in length.

5. The FFP of claim 1 wherein said wafer portion of said wafered ferrule is bonded to said ferrule with a UV curable epoxy.

6. The FFP of claim 1 which has finesse equal to or greater than about 50.

7. The FFP of claim 1 which has finesse equal to or greater than about 300.

8. The FFP of claim 1 which has finesse equal to or greater than about 600.

9. The FFP of claim 1 in which said mirrors are multilayer deposited $Si/SiO_2$ mirrors.

10. The FFP of claim 1 in which the reflectivities of said mirrors are both 95% or greater.

11. The FFP of claim 1 which is tunable.

12. The FFP of claim 1 in which said filter is tuned by changing the resonance cavity length.

13. The FFP of claim 12 which comprises a piezoelectric transducer system which functions to change said resonance cavity length.

14. The FFP of claim 1 in which said filter is tuned by changing the index of refraction of the resonance cavity.

15. The FFP of claim 1 which is a fixed wavelength filter.

16. The FFP of claim 15 in which an index matching material is positioned between said second mirror and said second end of said wafer to fill said gap.

17. The FFP of claim 11 in which said means for holding said ferrules in an aligned relative axial relation is a rotary mechanical splice.

18. The FFP of claim 1 in which said first mirror does not cover the entire area of the ferrule end face on which it is deposited.

19. The FFP of claim 1 having less than 5% variation in FSR as a function of wavelength over the wavelength region from about 1.45 to 1.7 μm.

20. The FFP of claim 1 having less than 5% variation in finesse over the operable wavelength range of said FFP.

21. The FFP of claim 1 wherein said mirrored-end ferrule is beveled.

22. The FFP of claim 2 wherein said mirrored-end ferrule is beveled.

23. The FFP of claim 21 further including a piezoelectric transducer means for changing the length of said resonance cavity, said transducer means connected to said means for holding said ferrules.

24. The FFP of claim 22 further including a piezoelectric transducer means for changing the length of said resonance cavity, said transducer means connected to said means for holding said ferrules.

25. The fixed FFP of claim 15 wherein said means for holding said ferrules is a rotary mechanical splice fixture including a plurality of rods having substantially the same thermal coefficient of expansion as the material from which said ferrules are made.

26. The filter of claim 25 wherein said rods and said ferrules are made of glass.

27. The filter of claim 1 wherein said gap is filled with an index matching material.

28. The filter of claim 27 wherein the index of refraction of said index matching material can be controlled by application of an electric or magnetic field to thereby tune said filter to a selected frequency.

29. The filter of claim 27 wherein the index of refraction of said index matching material can be controlled by changing the temperature of said index matching material to thereby tune said filter to a selected frequency.

30. The filter of claim 1 wherein said means for holding said ferrules is a rotary mechanical splice fixture including a plurality of alignment rods and clamping means for clamping said alignment rods in rigid contact with said ferrules, said alignment rods fabricated from a different material from that material used in said ferrules.

31. The filter of claim 30 wherein said ferrules are made of glass and said rods are made of metal.

32. The filter of claim 30 wherein said alignment rods are fabricated from a material having a large positive coefficient of thermal expansion.

33. The filter of claim 32 wherein said material for fabricating said rods is metallic.

34. The filter of claim 32 wherein said wafer portion has an outer diameter smaller than the outer diameter of said ferrule portion, said wafer portion not held in rigid contact with said fixture.

35. The filter of claim 32 wherein said second mirror and an adjacent portion of said second ferrule have an outer diameter smaller than the outer diameter of the remaining portion of said second ferrule.

36. The filter of claim 35 wherein said second mirror and an adjacent portion of said second ferrule have an outer diameter smaller than the outer diameter of the remaining portion of said second ferrule.

37. The filter of claim 1 wherein said means for holding said ferrules comprises a one-piece body fabricated from materials having the same coefficient of thermal expansion having an alignment passage therethrough for receiving said ferrules and further including a plurality of holding screws which traverse said body to said passage such that said holding screws can be adjusted to hold said ferrules in alignment.

38. The filter of claim 37 wherein said means for holding said ferrules further include means for adjusting the axial alignment of said ferrules in said passage.

39. The filter of claim 38 wherein said means for holding said ferrules comprises a one-piece body fabricated from materials having a different coefficient of thermal expansion having an alignment passage therethrough for receiving said ferrules and further including a plurality of holding screws which traverse said body to said passage such that said holding screws can be adjusted to hold said ferrules in alignment.

40. The filter of claim 39 wherein said means for holding said ferrule further includes means for adjusting the axial alignment of said ferrules in said passage.

* * * * *